United States Patent
Murayama et al.

(10) Patent No.: US 9,955,287 B2
(45) Date of Patent: Apr. 24, 2018

(54) SETTING UP OF CONDITION BASED ON LOCATION FOR A MOBILE TERMINAL

(75) Inventors: Atsuhiko Murayama, Kanagawa (JP); Hiroyuki Aoki, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/346,897

(22) PCT Filed: Jun. 15, 2012

(86) PCT No.: PCT/JP2012/065310
§ 371 (c)(1),
(2), (4) Date: Mar. 24, 2014

(87) PCT Pub. No.: WO2013/046817
PCT Pub. Date: Apr. 4, 2013

(65) Prior Publication Data
US 2014/0213292 A1    Jul. 31, 2014

(30) Foreign Application Priority Data
Sep. 26, 2011    (JP) .................................. 2011-209775

(51) Int. Cl.
*H04W 4/00* (2009.01)
*H04W 4/02* (2009.01)
(Continued)

(52) U.S. Cl.
CPC ........ *H04W 4/008* (2013.01); *G06F 17/3087* (2013.01); *G06F 17/30867* (2013.01);
(Continued)

(58) Field of Classification Search
CPC ....... H04W 4/008; H04W 4/02; H04W 4/023; H04W 4/20; G06F 17/30867; G06F 17/3087; G06Q 30/02; G06Q 50/01
(Continued)

(56) References Cited

U.S. PATENT DOCUMENTS

2002/0111173 A1* 8/2002 Hendrey .............. H04W 4/206
455/456.3
2005/0014482 A1 1/2005 Holland et al.
(Continued)

FOREIGN PATENT DOCUMENTS

JP    2001-175718 A    6/2001
JP    2004-221827 A    8/2004
(Continued)

OTHER PUBLICATIONS

International Search Report corresponding to PCT/JP2012/065310, dated Aug. 28, 2012, 1 page.
(Continued)

*Primary Examiner* — King Poon
*Assistant Examiner* — Vincent Peren
(74) *Attorney, Agent, or Firm* — Wilmer Cutler Pickering Hale and Dorr LLP

(57) ABSTRACT

Information processing device (100) communicates with mobile terminals (200-1) to (200-2). Mobile terminals (200-1) to (200-2) perform near field communication with each other. Information processing device (100) decides a condition based on a distance from a first location associated with user information about users who use mobile terminals (200-1) to (200-2) to their current location and notifies mobile terminals (200-1) to (200-2) whether or not other user identification information that satisfies the decided condition has been stored.

3 Claims, 5 Drawing Sheets

(51) Int. Cl.
  *H04L 29/08* (2006.01)
  *G06F 17/30* (2006.01)
  *G06Q 30/02* (2012.01)
  *G06Q 50/00* (2012.01)
  *H04W 4/20* (2018.01)

(52) U.S. Cl.
  CPC ............ *G06Q 30/02* (2013.01); *G06Q 50/01* (2013.01); *H04L 67/18* (2013.01); *H04W 4/02* (2013.01); *H04W 4/023* (2013.01); *H04W 4/20* (2013.01)

(58) Field of Classification Search
  USPC ..................................................... 455/456.1
  See application file for complete search history.

(56) References Cited

U.S. PATENT DOCUMENTS

| | | | |
|---|---|---|---|
| 2005/0014517 A1 | 1/2005 | Holland et al. | |
| 2005/0020242 A1 | 1/2005 | Holland et al. | |
| 2005/0020280 A1 | 1/2005 | Holland et al. | |
| 2005/0020281 A1 | 1/2005 | Holland et al. | |
| 2005/0026589 A1* | 2/2005 | Holland et al. | 455/404.1 |
| 2005/0037773 A1 | 2/2005 | Holland et al. | |
| 2005/0048946 A1 | 3/2005 | Holland et al. | |
| 2005/0048947 A1 | 3/2005 | Holland et al. | |
| 2005/0048948 A1 | 3/2005 | Holland et al. | |
| 2007/0111703 A1 | 5/2007 | Holland et al. | |
| 2007/0150444 A1* | 6/2007 | Chesnais et al. | 707/3 |
| 2008/0136670 A1 | 6/2008 | Tengler et al. | |
| 2008/0268875 A1 | 10/2008 | Holland et al. | |
| 2009/0012953 A1* | 1/2009 | Chu | H04W 4/02 |
| 2010/0185605 A1 | 7/2010 | Chu et al. | |
| 2013/0059559 A1 | 3/2013 | Holland et al. | |
| 2013/0344845 A1 | 12/2013 | Holland et al. | |

FOREIGN PATENT DOCUMENTS

| | | |
|---|---|---|
| JP | 2005-346299 | 12/2005 |
| JP | 2006-166307 A | 6/2006 |
| JP | 2007-142613 | 6/2007 |
| JP | 2009-272951 A | 11/2009 |
| JP | 2010-081021 | 8/2010 |

OTHER PUBLICATIONS

Extended European Search Report issued by the European Patent Office for Application No. 12837491.5 dated Apr. 23, 2015 (11 pages).
Extended European Search Report corresponding to European Application No. 12837384.2, dated Oct. 5, 2015, 9 pages.
Tsutomu Tsuboi, et al. "Dual Receiver Communication for DSRC", Future Generation Communication and Networking, Second International Conference on IEEE, Piscataway, NJ, USA, XP031383955, Dec. 13, 2008, pp. 459-464.
Japanese Office Action issued in corresponding Japanese Application No. 2013-535970, dated Mar. 22, 2016, 3 pages.
Japanese Office Action issued by the Japan Patent Office for Japan Application No. 2016-247829 dated Dec. 19, 2017 (3 pages).

* cited by examiner

Fig.3

| User identification information | User information | First location | Distance range from the first location to the current location | Condition |
|---|---|---|---|---|
| 00000001 | Graduated from Metropolitan A High School | Tokyo Metropolis | ~50km | Graduated from Metropolitan A High School |
| | | | 51~200km | Graduated from a high school in Tokyo Metropolis |
| | | | 201~3000km | Graduated from a high school in the Metropolitan Area |
| | | | 3001km~ | Graduated from a high school in Japan |
| 12345678 | Graduated from Saitama Prefectural B High School | Saitama Prefecture | ~50km | Graduated from Saitama Prefectural B High School |
| | | | 51~200km | Graduated from a high school in Saitama Prefecture |
| | | | 201~3000km | Graduated from a high school in the Metropolitan Area |
| | | | 3001km~ | Graduated from a high school in Japan |
| ... | ... | ... | ... | ... |

SETTING UP OF CONDITION BASED ON LOCATION FOR A MOBILE TERMINAL

CROSS-REFERENCE TO RELATED APPLICATIONS

This application is a national stage application of International Application No. PCT/JP2012/065310 entitled "Information Processing Devices," filed on Jun. 15, 2012, which claims the benefit of the priority of Japanese patent application No. 2011-209775, filed on Sep. 26, 2011, the disclosures of each of which are hereby incorporated by reference in their entirety.

TECHNICAL FIELD

The present invention relates to information processing devices, mobile terminals, communication systems, communication methods, and programs that serve to process information.

BACKGROUND ART

Some of mobile terminals that have been released in recent years have a near field communication function using a technique such as infrared or Bluetooth besides a radio communication function for speech communication and transmission and reception for electronic mail.

For these mobile terminals, a technique that exchanges information between mobile terminals that are approaching to each other using the near field communication function has been developed (for example, refer to Patent Literature 1). For example, a technique that, when users who graduated from the same school are approaching to each other, causes mobile terminals that the users carry respectively to perform the near field communication could be contemplated.

RELATED ART LITERATURE

Patent Literature

Patent Literature 1: JP2007-142613A, Publication

SUMMARY OF THE INVENTION

Problem to be Solved by the Invention

In the foregoing technique, a condition of whether one mobile terminal performs the near field communication with another one is unconditionally set up based on user information about the users to which these mobile terminals belong. Thus, a problem will arise in which a condition, that is based on the locations of mobile terminals, cannot be flexibly arranged. For example, if users who graduated from the same metropolitan high school are in the Metropolitan Area, the likelihood is that they will pass by each other. In contrast, if they are in Hokkaido, Japan, it is not likely that they would pass by each other.

An object of the present invention is to provide information processing devices, mobile terminals, communication systems, communication methods, and programs that can solve the foregoing problem.

Means that Solve the Problem

An information processing device according to the present invention, including:

a communication section that acquires current location information and user identification information from a mobile terminal, the current location information representing a current location of the mobile terminal;

a storage section that correlatively stores user information associated with the user identification information and a first location associated with the user information;

a condition decision section that decides a condition based on a distance from the current location represented by the current location information acquired by said communication section to said first location; and a control section that searches said storage section for other user identification information that satisfies the condition decided by said condition decision section and transmits condition information that represents the condition and presence information that denotes whether or not the other user identification information that satisfies said condition has been stored in said storage section as said searched result to a mobile terminal identified by said acquired user identification information through said communication section.

A mobile terminal according to the present invention is a mobile terminal that performs radio communication, including:

a near field communication section that has a near field communication function;

a location information acquisition section that acquires location information that represents a current location of the mobile terminal; and a communication section that transmits the location information acquired by said location information acquisition section and user identification information of a user who uses the mobile terminal to another device.

A communication system according to the present invention, including, an information processing device having:

a communication section that acquires current location information and user identification information from a mobile terminal, the current location information representing a current location of the mobile terminal, a storage section that correlatively stores user information associated with the user identification information and a first location associated with the user information, a condition decision section that decides a condition based on a distance from the current location represented by the current location information acquired by said communication section to said first location, and a control section that searches said storage section for other user identification information that satisfies the condition decided by said condition decision section and transmits condition information, that represents the condition and presence information that denotes whether or not the other user identification information that satisfies said condition has been stored in said storage section as said searched result, to a mobile terminal identified by said acquired user identification information through said communication section; and a mobile terminal having:

a near field communication section that has a near field communication function, a location information acquisition section that acquires location information that represents a current location, and a communication section that transmits the location information acquired by said location information acquisition section and user identification information of a user who uses the mobile terminal to said information processing device.

A communication method according to the present invention, including the processes of:

acquiring current location information and user identification information from a mobile terminal, the current location information representing a current location of the mobile terminal;

deciding a condition based on a distance from the current location represented by said acquired current location information to a first location associated with said user identification information;

searching a storage section for other user identification information that satisfies said decided condition, said storage section correlatively storing the user information associated with the user identification information and the first location associated with the user information; and transmitting condition information, that represents said condition and presence information that denotes whether or not the other user identification information that satisfies said condition has been stored in said storage section as said searched result, to a mobile terminal identified by said acquired user identification information.

A program according to the present invention is a program that causes an information processing device to execute procedures including:

acquiring current location information and user identification information from a mobile terminal, the current location information representing a current location of the mobile terminal;

deciding a condition based on a distance from the current location represented by said acquired current location information to a first location associated with said user identification information;

searching a storage section for other user identification information that satisfies said decided condition, said storage section correlatively storing the user information associated with the user identification information and the first location associated with the user information; and transmitting condition information, that represents said condition and presence information that denotes whether or not the other user identification information that satisfies said condition has been stored in said storage section as said searched result, to a mobile terminal identified by said acquired user identification information.

Effect of the Invention

As described above, according to the present invention, a condition under which a mobile terminal informs its user that it performs the near field communication with another mobile terminal can be flexibly set up depending on their locations.

BRIEF DESCRIPTION OF DRAWINGS

FIG. 3 is a schematic diagram showing an example of information stored in a storage section shown in FIG. 2.

MODE FOR CARRYING OUT THE INVENTION

Next, with reference to the accompanying drawings, embodiments of the present invention will be described.

Figure 1:
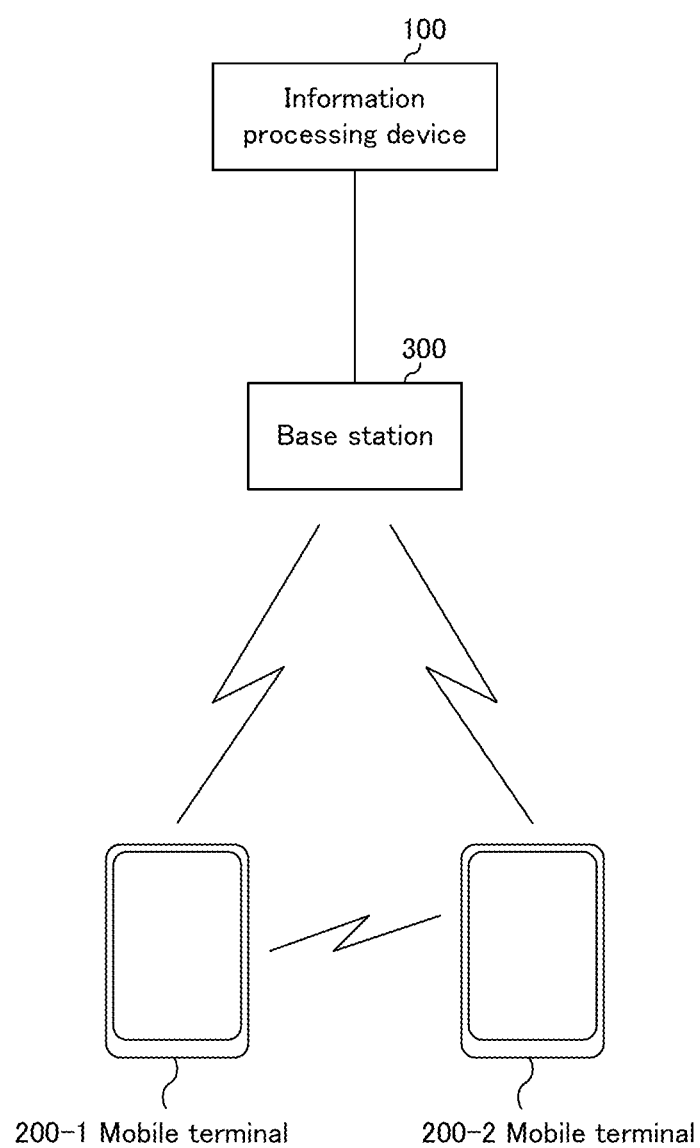
FIG. 1 is a schematic diagram showing a communication system according to an embodiment of the present invention.

FIG. 1 is a schematic diagram showing a communication system according to an embodiment of the present invention.

The communication system according to this embodiment has information processing device 100, mobile terminals 200-1 to 200-2, and base station 300. FIG. 1 shows that there are two mobile terminals. It should be noted, however, that the number of mobile terminals may be three or more.

Information processing device 100 can communicate with mobile terminals 200-1 to 200-2 through base station 300 and notifies mobile terminals 200-1 to 200-2 of the presence of other mobile terminals with which the former can perform the near field communication. The near field communication is a kind of radio communication that can transmit and receive signals in a range from several meters to several ten meters.

Figure 2:
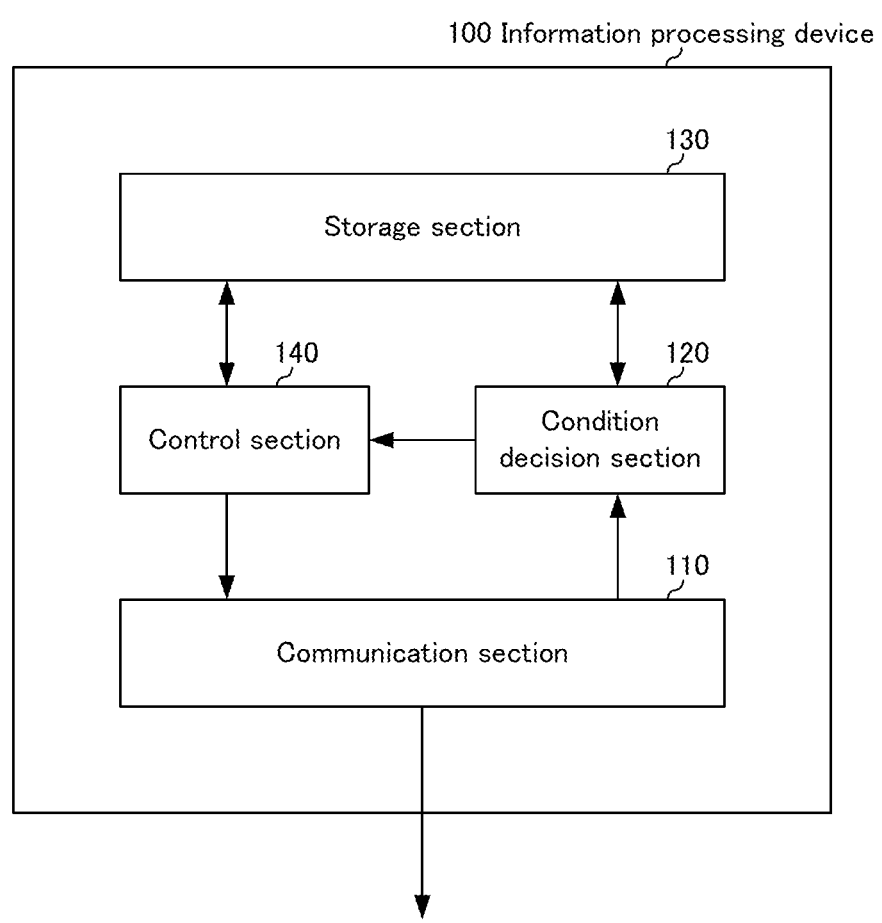
FIG. 2 is a schematic diagram showing an example of the internal structure of an information processing device shown in FIG. 1.

FIG. 2 is a schematic diagram showing an example of the internal structure of information processing device 100 shown in FIG. 1.

As shown in FIG. 2, information processing device 100 shown in FIG. 1 has communication section 110, condition decision section 120, storage section 130, and control section 140. FIG. 2 shows only components relating to the present invention of those of information processing device 100 shown in FIG. 1.

Communication section 110 acquires current location information that represents the current locations of mobile terminals 200-1 to 200-2 and user identification information that can identify the users who use mobile terminals 200-1 to 200-2. In addition to the user identification information, communication section 110 acquires supplementary user identification information. The supplementary user identification information is acquired using the near field communication function with which mobile terminals 200-1 to 200-2 are provided and which is user identification information that can identify users of other mobile terminals.

Condition decision section 120 calculates the distance from a first location associated with the user information of each of the users who use mobile terminals 200-1 to 200-2 to the current location of each of mobile terminals 200-1 to 200-2. The user information and the first location associated therewith are pre-stored in storage section 130. The user information and the first location will be described later in detail. Communication section 110 acquires the current location from each of mobile terminals 200-1 to 200-2.

Condition decision section 120 decides a condition based on the calculated distance. Under the condition, information processing device 100 notifies mobile terminals 200-1 to 200-2 of the presence of another mobile terminal with which the former performs the near field communication. At this point, condition decision section 120 decides a condition based on information stored in storage section 130.

Storage section 130 individually pre-stores user information of users who use mobile terminals 200-1 to 200-2.

FIG. 3 is a schematic diagram showing an example of information stored in storage section 130 shown in FIG. 2.

As shown in FIG. 3, storage section 130 shown in FIG. 2 correlatively pre-stores user identification information, user information, a first location, a distance range from the first location to the current location, and a condition.

The user identification information is information that can identify a mobile terminal that belong to a user and is uniquely assigned to the mobile terminal. The user identification information may be, for example, an electronic mail address or a telephone number as long as information processing device 100 can designate a mobile terminal and set up a decided condition.

The user information is information about the users who use mobile terminals 200-1 to 200-2. The user information may be, for example, the birth place of the user, the high school or university from which he or she graduated, the company to which he or she belongs, his or her address as long as any location can be identified.

The first location represents a location associated with the user information. The first location may be, for example, an address, a city, or a prefecture and is information that represents a place (location) containing the user information. For example, as shown in FIG. 3, if the user information is "graduated from Metropolitan A High School," "Tokyo Metropolis" in which Metropolitan A High School is located may be first location information. If the user information is "graduated from Saitama Prefectural B High School," "Saitama Prefecture" in which Saitama Prefectural B High School is located may be first location information. It is preferable that the first location information be an area that is as narrow as possible as possible so that the distance to the current location (that will be described later) can be calculated.

The distance ranges from the first location to the current location are the ranges that the distance from the pre-stored first location to the current location of each of mobile terminals 200-1 to 200-2 is divided into a plurality of ranges.

The condition is the condition so that information processing device 100 notifies mobile terminals 200-1 to 200-2 of the presence of another mobile terminals.

For example, user identification information "00000001," user information "graduated from Metropolitan A High School," first location "Tokyo Metropolis," distance range from the first location to the current location "50 km or less," and condition "graduated from Metropolitan A High School" are correlatively pre-stored. Thus, if the user information of the user whose user identification information is "00000001" is "graduated from Metropolitan A High School" and if the current location represented by the current location information acquired from the mobile terminal that belongs to the user is 50 km or less away from first location "Tokyo Metropolis," control section 140 notifies the mobile terminal whether or not there is another mobile terminal that has user information "graduated from Metropolitan A High School."

In addition, user identification information "00000001," user information "graduated from Metropolitan A High School," first location "Tokyo Metropolis," distance range from the first location to the current location "51 km to 200 km," and condition "graduated from a high school in Tokyo Metropolis" are correlatively pre-stored. Thus, if the user information of the user whose user identification information is "00000001" is "graduated from Metropolitan A High School" and if the current location represented by the current location information acquired from the mobile terminal that belongs to the user is 51 km to 200 km away from first location "Tokyo Metropolis," control section 140 notifies the mobile terminal whether or not there is another mobile terminal that has user information "graduated from a high school in Tokyo Metropolis."

In addition, user identification information "00000001," user information "graduated from Metropolitan A High School," first location "Tokyo Metropolis," distance range from the first location to the current location "201 km to 3000 km," and condition "graduated from a high school in the Metropolitan Area" are correlatively pre-stored. Thus, if the user information of the user whose user identification information is "00000001" is "graduated from Metropolitan A High School" and if the current location represented by the current location information acquired from the mobile terminal that belongs to the user is 201 km to 3000 km away from first location "Tokyo Metropolis," control section 140 notifies the mobile terminal whether or not there is another mobile terminal that has user information "graduated from a high school in the Metropolitan Area."

In addition, user identification information "00000001," user information "graduated from Metropolitan A High School," first location "Tokyo Metropolis," distance range from the first location to the current location "3001 km or more," and condition "graduated from a high school in Japan" are correlatively pre-stored. Thus, if the user information of the user whose user identification information is "00000001" is "graduated from Metropolitan A High School" and if the current location represented by the current location information acquired from the mobile terminal that belongs to the user is 3001 km or more away from first location "Tokyo Metropolis," control section 140 notifies the mobile terminal whether or not there is another mobile terminal that has user information "graduated from a high school in Japan."

In addition, user identification information "12345678," user information "graduated from Saitama Prefectural B High School," first location "Saitama Prefecture," distance range from the first location to the current location "50 km or less," and condition "graduated from Saitama Prefectural B High School" are correlatively pre-stored. Thus, if the user information of the user whose user identification information is "12345678" is "graduated from Saitama Prefectural B High School" and if the current location represented by the current location information acquired from the mobile terminal that belongs to the user is 50 km or less away from first location "Saitama Prefecture," control section 140 notifies the mobile terminal whether or not there is another mobile terminal that has user information "graduated from Saitama Prefectural B High School."

In addition, user identification information "12345678," user information "graduated from Saitama Prefectural B High School," first location "Saitama Prefecture," distance range from the first location to the current location "51 km to 200 km," and condition "graduated from a high school in Saitama Prefecture" are correlatively pre-stored. Thus, if the user information of the user whose user identification information is "12345678" is "graduated from Saitama Prefectural B High School" and if the current location represented by the current location information acquired from the mobile terminal that belongs to the user is 51 km to 200 km away from first location "Saitama Prefecture," control section 140 notifies the mobile terminal whether or not there is another mobile terminal that has user information "graduated from a high school in Saitama Prefecture."

In addition, user identification information "12345678," user information "graduated from Saitama Prefectural B High School," first location "Saitama Prefecture," distance range from the first location to the current location "201 km to 3000 km," and condition "graduated from a high school in the Metropolitan Area" are correlatively pre-stored. Thus, if the user information of the user whose user identification information is "12345678" is "graduated from Saitama Prefectural B High School" and if the current location represented by the current location information acquired from the mobile terminal that belongs to the user is 201 km to 3000 km away from first location "Saitama Prefecture," control section 140 notifies the mobile terminal whether or not there is another mobile terminal that has user information "graduated from a high school in the Metropolitan Area."

In addition, user identification information "12345678," user information "graduated from Saitama Prefectural B High School," first location "Saitama Prefecture," distance range from the first location to the current location "3001 km or more," and condition "graduated from a high school in Japan" are correlatively pre-stored. Thus, if the user information of the user whose user identification information is "12345678" is "graduated from "Saitama Prefectural B High School" and if the current location represented by the current location information acquired from the mobile terminal that belongs to the user is 3001 km or more away from first location "Saitama Prefecture," control section 140 notifies the mobile terminal whether or not there is another mobile terminal that has user information "graduated from a high school in Japan."

Control section 140 searches storage section 130 for user identification information that satisfies the condition decided by condition decision section 120. Thereafter, control section 140 transmits condition information that represents the condition and presence information that denotes whether or not other user identification information that satisfies the condition has been stored in storage section 130 as the result searched therefrom to mobile terminals 200-1 to 200-2 through communication section 110. At this point, control section 140 transmits the condition information and the presence information to a mobile terminal from which the former has acquired the user identification information and the current location information.

If control section 140 has retrieved another user identification information that satisfies the condition from storage section 130, control section 140 transmits user information associated with the retrieved other user identification information to mobile terminals 200-1 to 200-2 through the communication section.

In addition, control section 140 determines whether or not the supplementary user identification information acquired by communication section 110 satisfies the condition decided by condition decision section 120.

Mobile terminals 200-1 to 200-2 are mobile radio communication devices that communicate with information processing device 100 through base station 300.

Figure 4:
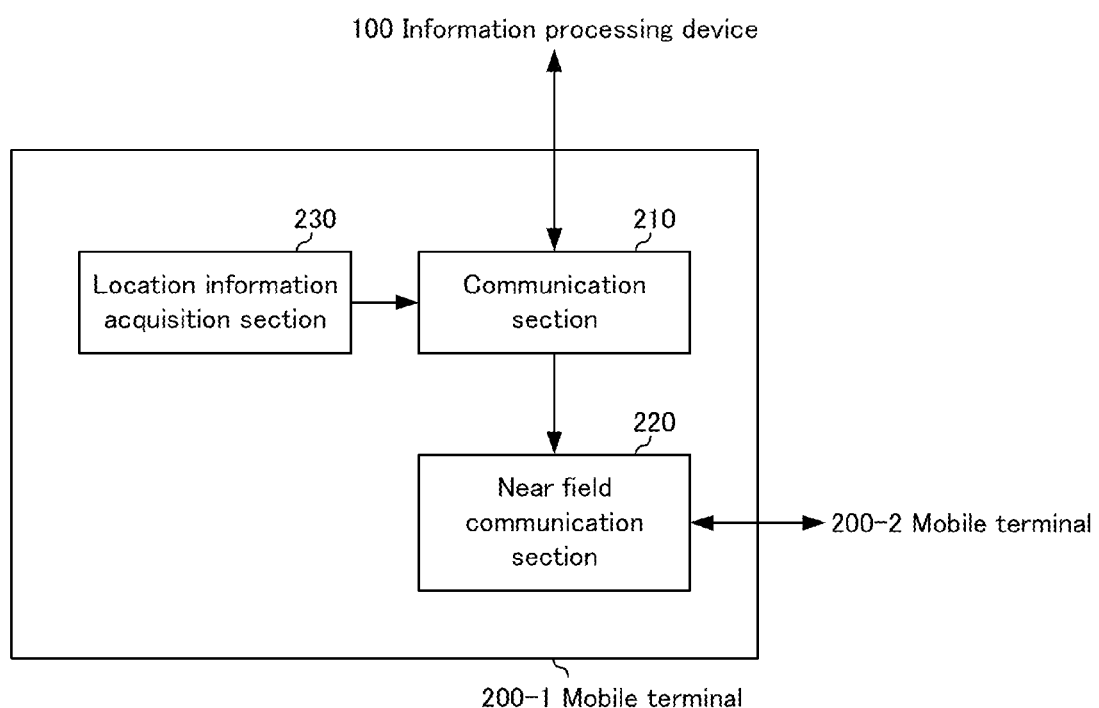
FIG. 4 is a schematic diagram showing an example of the internal structure of a mobile terminal shown in FIG. 1.

FIG. 4 is a schematic diagram showing an example of the internal structure of mobile terminal 200-1 shown in FIG. 1. The internal structure of mobile terminal 200-2 shown in FIG. 1 is the same as that of mobile terminal 200-1.

As shown in FIG. 4, mobile terminal 200-1 shown in FIG. 1 has communication section 210, near field communication section 220, and location information acquisition section 230. FIG. 4 shows only components that relate to the present invention of those of mobile terminal 200-1 shown in FIG. 1.

Communication section 210 communicates with information processing device 100 through base station 300. In addition, communication section 210 transmits the current location information that is output from location information acquisition section 230 and the user identification information of the user that uses mobile terminal 200-1 to information processing device 100 through base station 300.

Near field communication section 220 performs the near field communication with other mobile terminals based on information transmitted from information processing device 100. The near field communication is a kind of radio communication that is performed in a near distance and that uses Bluetooth or the like.

Location information acquisition section 230 acquires location information that represents the current location of mobile terminal 200-1. For example, Location information acquisition section 230 may acquire location information from GPS (Global Positioning System) satellites using the GPS function. Location information acquisition section 230 outputs the acquired location information as current location information to communication section 210.

Base station 300 is an ordinary radio base station that is connected to information processing device 100 and performs radio communication with mobile terminals 200-1 to 200-2.

Next, a communication method according to this embodiment will be described. In this communication method, processes performed in information processing device 100 and mobile terminal 200-1 shown in FIG. 1 will be exemplified. The processes performed in mobile terminal 200-2 are the same as those performed in mobile terminal 200-1.

Figure 5:
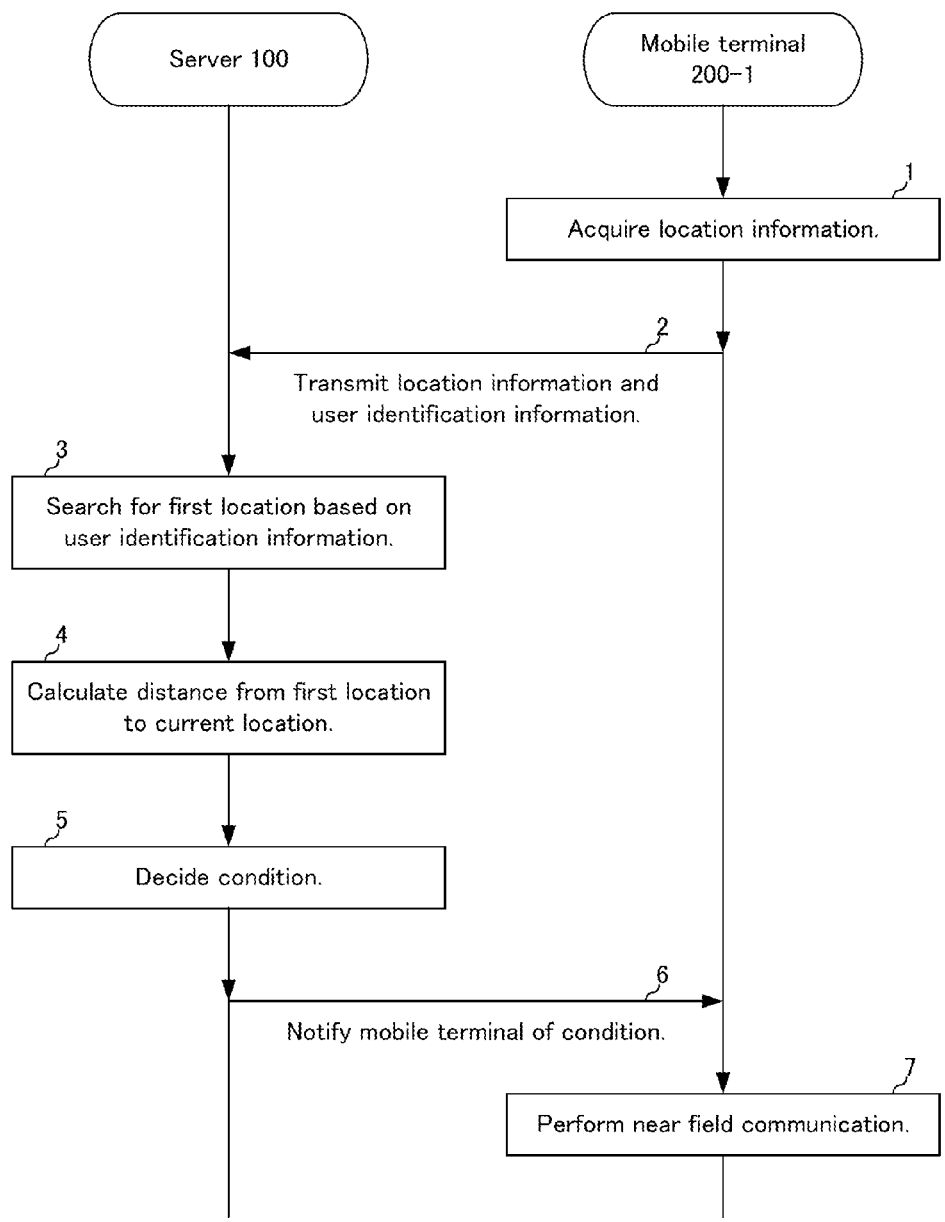
FIG. 5 is a sequence chart describing a communication method according to the embodiment shown in FIG. 1.

FIG. 5 is a sequence chart describing the communication method according to the embodiment shown in FIG. 1.

At step 1, location information acquisition section 230 of mobile terminal 200-1 acquires location information that represents the current location of mobile terminal 200-1.

Thereafter, at step 2, communication section 210 of mobile terminal 200-1 transmits the location information acquired by location information acquisition section 230 as current location information to information processing device 100 through base station 300. At this point, communication section 210 transmits user identification information along with the location information. Thus, communication section 110 can acquire the current location information from mobile terminal 200-1.

Communication section 110 of information processing device 100 receives the location information and user identification information from mobile terminal 200-1. Thereafter, at step 3, condition decision section 120 searches storage section 130 for first location associated with the user identification information as a search key.

Thereafter, at step 4, condition decision section 120 calculates the distance from the location represented by the retrieved first location to the current location represented by the received current location information.

Thereafter, at step 5, condition decision section 120 searches storage section 130 for a condition associated with the user identification information transmitted from mobile terminal 200-1 and the calculated distance and decides the condition as described with reference to FIG. 3.

Thereafter, at step 6, control section 140 notifies mobile terminal 200-1 of the decided condition.

Thereafter, communication section 210 of mobile terminal 200-1 receives the condition. Thereafter, at step 7, near field communication section 220 performs the near field communication with another mobile terminal based on the condition.

After communication section 210 has received the condition, near field communication section 220 performs the near field communication in an ordinary manner.

For example, if information processing device 100 has pre-stored the same information about mobile terminals 200-1 to 200-2 and has acquired their current locations, information processing device 100 determines whether or not there is another mobile terminal that satisfies the condition based on the current locations of mobile terminals 200-1 to 200-2. If there is such a mobile terminal, information processing device 100 transmits an ID as identification information of another mobile terminal to mobile terminals 200-1 to 200-2 along with the condition. When mobile terminals 200-1 to 200-2 receive the ID and condition, they start performing the near field communication based on the ID of another mobile terminal.

In this example, a mobile terminal or the information processing device may determine whether or not there is another mobile terminal in the range of the near field communication of the former mobile terminal.

If a mobile terminal determines whether or not there is another mobile terminal in the range of the near field communication, the former mobile terminal starts performing the near field communication at a predetermined timing and determines whether or not there is another mobile terminal in the area. If the former mobile terminal has determined that there is another mobile terminal, the former mobile terminal generates a sound or displays predetermined information so as to notify the user of the former mobile terminal that there is another mobile terminal in the area.

If the information processing device determines whether there are mobile terminals in the range of the near field communication, the information processing device periodically acquires the current location information of the mobile terminals and determines whether or not there are mobile terminals that are close to each other based on the acquired current location information. If the information processing device has determined that there are mobile terminals that are close to each other, the information processing device notifies the mobile terminals that there are mobile terminals that are close to each other. The mobile terminals notify their users that there is another mobile terminal in the foregoing manner.

Alternatively, mobile terminals 200-1 to 200-2 may have another function that determines whether or not there is another mobile terminal that is close to the former mobile terminal.

For example, mobile terminal 200-1 pre-calculates the distance from its current location to the first location associated with the user information of mobile terminal 200-1 (this distance is denoted by distance a). Likewise, mobile terminal 200-2 pre-calculates the distance from its current location to the first location associated with the user information of mobile terminal 200-2 (this distance is denoted by distance b). Mobile terminal 200-1 determines that there is mobile terminal 200-2 that is close to mobile terminal 200-1 using a communication means (ordinary radio communication or near field communication).

Information processing device 100 calculates the distance from the first location of mobile terminal 200-1 to the first location of mobile terminal 200-2 (this distance is denoted by distance L).

Whether or not there are mobile terminals that are close to each other may be determined based on distances a, b, and L.

For example, if the relationship of L<a/5 and (or) L<b/5 is satisfied, mobile terminal 200-1 notifies its user that there is mobile terminal 200-2 close to mobile terminal 200-1.

In other words, assuming that the greater are a and b than L, the higher is the value that the user has, mobile terminal 200-1 notifies him or her that there is another mobile terminal.

The determination process may be performed by information processing device 100 or mobile terminals 200-1 to 200-2.

Thus, a condition under which the user of a mobile terminal is notified of another mobile terminal with which the former mobile terminal performs the near field communication can be flexibly set up corresponding to the location of the former mobile terminal.

The processes performed by the individual components of information processing device 100 may be accomplished by logic circuits that are manufactured to meet specific purposes. Alternatively, a computer program that describes contents of processes (hereinafter referred to as "program") may be recorded on a record medium from which information processing device 100 can read the program. The program recorded on the record medium may be read and executed by information processing device 100. The record medium from which the program can be read by information processing device 100 includes a movable record medium such as a floppy disk (registered trademark), a magneto optical disc, a DVD, or a CD, a memory such as a ROM or a RAM built in information processing device 100, or a HDD. The program recorded on the record medium is read by a CPU (not shown) of information processing device 100. The foregoing processes are performed under the control of the CPU. The CPU operates as a computer that executes the program that is read from the record medium.

The present invention has been described with reference to the embodiments. However, it should be understood by those skilled in the art that the structure and details of the present invention may be changed in various manners without departing from the scope of the present invention.

The present application claims priority based on Japanese Patent Application JP 2011-209775 filed on Sep. 26, 2011, the entire contents of which are incorporated herein by reference in its entirety.

The invention claimed is:

1. A communication method, comprising the processes of:
correlatively storing, in advance, user identification information, user information, and first location information, respectively, for each of a plurality of mobile terminals,
   wherein, for each respective mobile terminal, the user identification information identifies that mobile terminal, and
   wherein, for each respective mobile terminal, the user information is information about a user of the respective mobile terminal from which the correlatively stored first location for the respective mobile terminal can be identified;
communicating with a first mobile terminal of the plurality of mobile terminals and acquiring, from the first mobile terminal, current location information of the first mobile terminal and the user identification information of the first mobile terminal,
   wherein the acquired current location information represents a current location of the first mobile terminal;
deciding a condition based on a distance from the current location of the first mobile terminal to the first location stored in a storage section for the first mobile terminal,
   wherein the condition relates to the user information stored in the storage section for the first mobile terminal; and
searching the storage section for other user identification information associated with a satisfied user information and, as a result of the search, transmits condition information and presence information to the first mobile terminal, wherein the satisfied user information is user information for another mobile terminal which satisfies the condition decided by a condition decision section,
wherein the condition information represents the condition, and
wherein the presence information denotes whether or not the user identification information associated with the satisfied user information is stored in the storage section.

2. An information processing device, comprising:
a storage section that correlatively stores, in advance, user identification information, user information, and first location information, respectively, for each of a plurality of mobile terminals,
 wherein, for each respective mobile terminal, the user identification information identifies that mobile terminal, and
 wherein, for each respective mobile terminal, the user information is information about a user of the respective mobile terminal from which the correlatively stored first location for the respective mobile terminal can be identified;
a communication section that communicates with a first mobile terminal of the plurality of mobile terminals and acquires, from the first mobile terminal, current location information of the first mobile terminal and the user identification information of the first mobile terminal,
 wherein the acquired current location information represents a current location of the first mobile terminal;
a condition decision section that decides a condition based on a distance from the current location of the first mobile terminal to the first location stored in the storage section for the first mobile terminal,
 wherein the condition relates to the user information stored in the storage section for the first mobile terminal; and
a control section that searches the storage section for other user identification information associated with a satisfied user information and, as a result of the search, transmits condition information and presence information to the first mobile terminal,
 wherein the satisfied user information is user information for another mobile terminal which satisfies the condition decided by the condition decision section,
 wherein the condition information represents the condition, and
 wherein the presence information denotes whether or not the user identification information associated with the satisfied user information is stored in the storage section.

3. A mobile terminal, comprising:
a communication section that:
 communicates with an information processing device;
 transmits, to the information processing device, current location information of the mobile terminal and user identification information of the mobile terminal, and
 receives, from the information processing device, condition information and presence information,
 wherein the transmitted current location information represents a current location of the mobile terminal;
 wherein the condition information and the presence information are received as a result of a search, which is performed at the information processing device, for other user identification information associated with a satisfied user information,
 wherein the satisfied user information is user information for another mobile terminal which satisfies a condition decided by the information processing device based on a distance from the current location of the mobile terminal to a first location stored in the information processing device for the mobile terminal,
 wherein the first location for the mobile terminal is correlatively stored in the information processing device, in advance, in association with the user identification information of the mobile terminal and user information about a user of the mobile terminal,
 wherein the first location is identified, by the information processing device, from the user information about the user of the mobile terminal,
 wherein the condition relates to the stored user information about the user of the mobile terminal;
 wherein the condition information represents the condition, and
 wherein the presence information denotes whether or not the other user identification information associated with the satisfied user information is stored in the information processing device.

* * * * *